Dec. 10, 1963     D. FAURE     3,113,580
HYDRAULIC CONTROL DEVICE FOR TRACTORS AND THE LIKE
Filed May 4, 1960     3 Sheets-Sheet 1
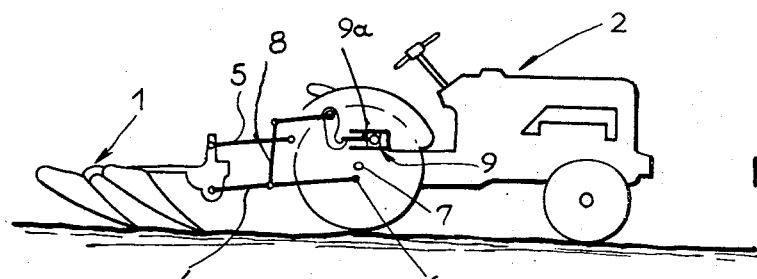
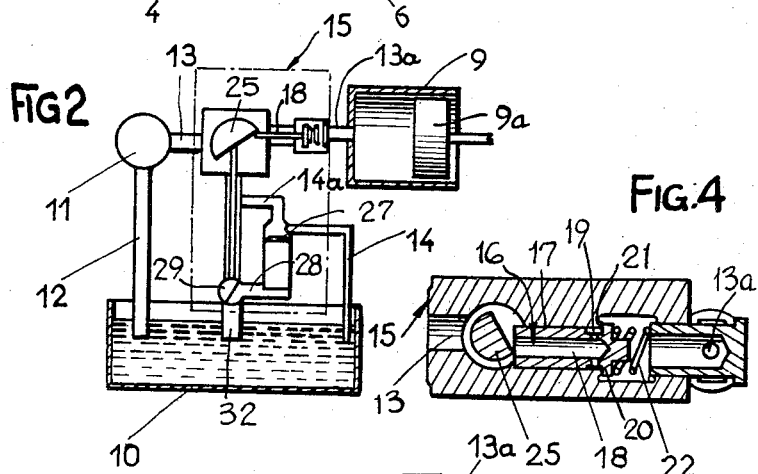
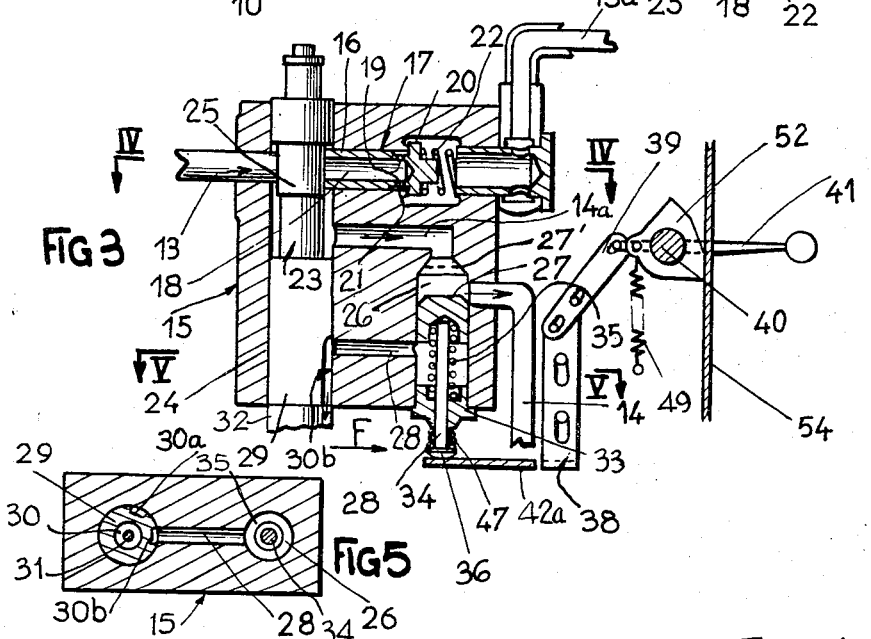
INVENTOR:
DANIEL FAURE
By: NOLTE AND NOLTE
ATTORNEYS INVENTOR:
DANIEL FAURE
By: NOLTE AND NOLTE
ATTORNEYS

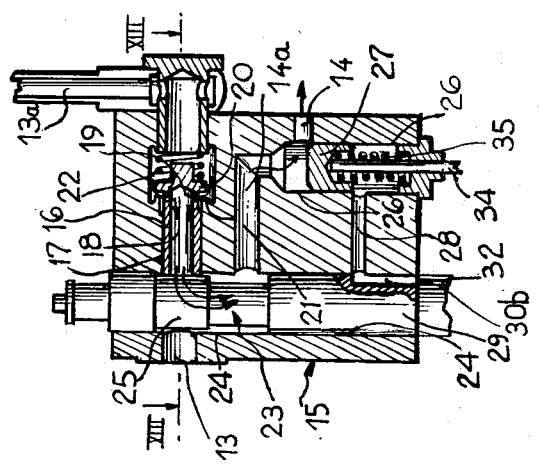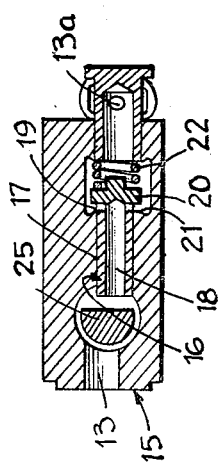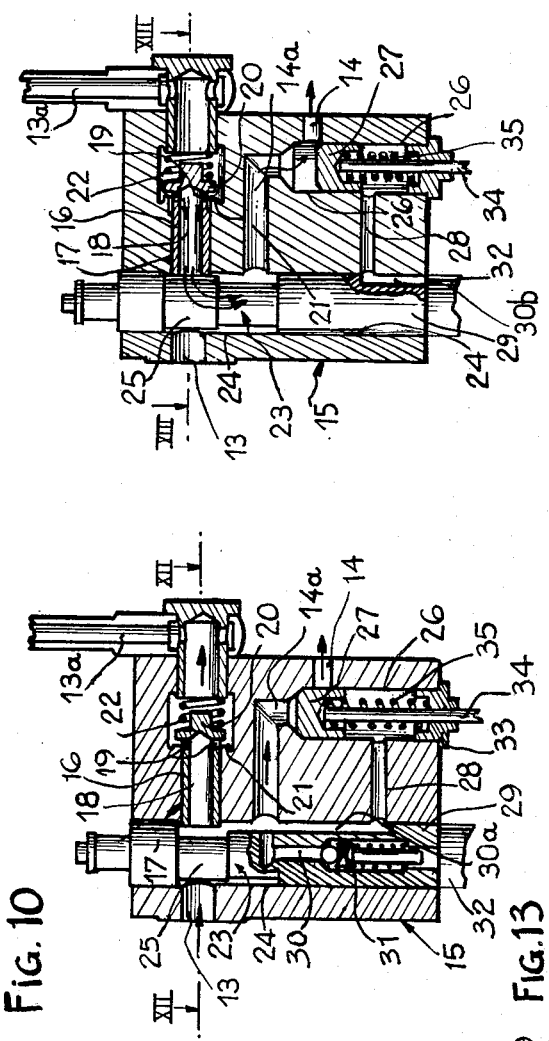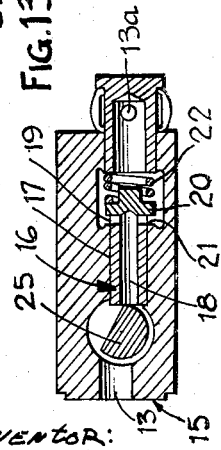

United States Patent Office 3,113,580
Patented Dec. 10, 1963

3,113,580
HYDRAULIC CONTROL DEVICE FOR TRACTORS AND THE LIKE
Daniel Faure, 322 Ave. Berthelot, Lyon, France
Filed May 4, 1960, Ser. No. 26,770
Claims priority, application France May 19, 1959
19 Claims. (Cl. 137—596.13)

This invention relates in general to coupling and raising devices for tractors and other machines hauling notably various equipments or tools bearing on the ground and connected through said means to the driving axle.

It has already been proposed to counteract the tendency of the driving wheels of the tractor or like towing vehicle to slip on the ground when the resistance produced by the towed equipment becomes equal to or greater than the permissible tractive effort by providing in frequent cases the hydraulic coupling and raising devices with a regulating member of variable position which is interposed in a line of the hydraulic circuit of the raising system and controlled from a manual control member with a view, through an adequate throttling of said line, to create at will a variable pressure in the raising or lifting cylinder and thus produce what is usually called a transfer of weight or load from the towed equipment to the rear axle of the towing vehicle.

Some of the hitherto known propositions of this character utilize in a known manner a regulating member interposed in the exhaust line of the hydraulic circuit controlling the raising cylinder with a view to produce the aforesaid load transfer; the controlled pressure necessary in the raising cylinder for producing this load transfer is then obtained by simultaneously directing the feed pump output through the cylinder feed line and through the exhaust line while partly throttling the latter by means of the aforesaid throttling member.

The device of this invention pertains to the last-mentioned type of known arrangement and is remarkable notably in that said regulating member consists of a piston responsive to hydraulic servo means which is adapted to adjust the cross-sectional area of a common exhaust line from said raising cylinder and said feed pump, and to co-act momentarily, during the load transfer operation, with a push-member or like element acting as an actuatable stop whereby the position of said piston may be controlled with respect to said exhaust line.

According to another feature characterizing this invention, the aforesaid piston has its hydraulic circuit responsive to a distributor member responsive in turn to a non-return valve inserted in the line through which hydraulic fluid is supplied to the cylinder, whereby the movements of said piston are subordinate to the opening or closing of said valve, the assembly being so arranged that the opening movement of said non-return valve is attended by a backward or opening movement of said piston in relation to said exhaust line due to the fluid pressure existing in said line.

In practice, the essential component elements of the device, that is, the non-return valve, the hydraulically actuated piston and the servo means provided between the distributor member of the feed circuit associated with this piston and said non-return valve, are assembled to constitute a distributor unit of relatively reduced overall dimensions so that its mounting in the hydraulic circuit controlling the lifting cylinder is simplified to a substantial extent.

Regarding the hand control means for adjusting the position of the hydraulically actuated piston, it may consist of any suitable member such as a knob, hand-lever, etc. and notably be located according to the conventional practice, that is, within easy reach of the tractor driver so that he may easily and gradually control the load-transfer pressure created in the lifting cylinder.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

Other objects and advantages will become apparent from the following description taken in conjunction with the accompanying drawings in which:

FIGURE 1 illustrates schematically the principle of the coupling of a plough to a tractor by means of a hydraulically controlled coupling and raising or lifting device according to this invention;

FIGURE 2 is another schematic view showing the general arrangement of the hydraulic circuit of the raising device of FIG. 1;

FIGURE 3 is a sectional view showing on a larger scale a distributor unit incorporated in the hydraulic circuit of FIG. 2;

FIGURES 4 and 5 are cross-sections taken through the lines IV—IV and V—V of FIG. 3 respectively;

FIGURES 10 and 11 are cross-sections similar to FIGS. 3 and 6 but showing the component elements of the distributor unit in positions corresponding to the raising and lowering of the towed instrument respectively;

FIGURE 12 is a sectional view taken through the line XII—XII of FIGURE 10; and

FIGURE 13 is a sectional view taken through the line XIII—XIII of FIGURE 11.

Figure 6:
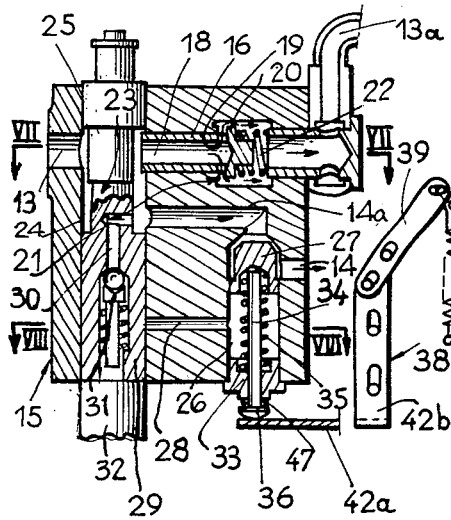
FIGURE 6 is a cross-section taken across the distributor unit which is similar to FIG. 3 and shows the various component elements of this unit in a different position.
Figure 7:
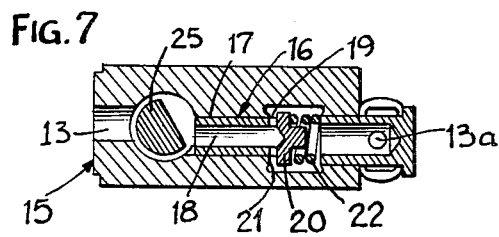
FIGURES 7 and 8 are cross-sections taken through the lines VII—VII and VIII—VIII of FIG. 6 respectively.
Figure 8:
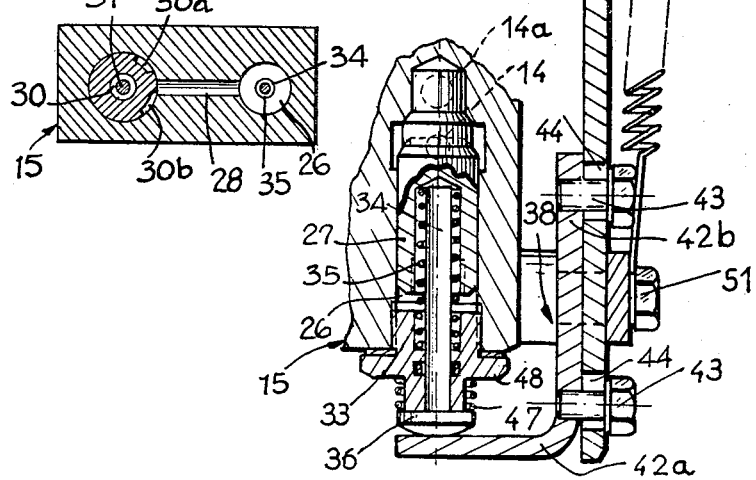

In the example illustrated in FIG. 1, a plough or other equipment 1 is coupled to a tractor 2 by means of a link or lever system 4, 5 wherein the lever 4 is attached to a point 6 under the driving axle 7 of the tractor and connected to a raising link 8 actuated in turn by the raising cylinder 9 having a piston 9a.

The hydraulic circuit controlling this raising cylinder 9, as shown in schematic form in FIG. 2, comprises essentially an oil tank 10, a feed pump 11 drawing oil from this tank through a line 12, a delivery line 13, 13a for feeding the cylinder 9, and a common exhaust line 14, 14a for the pump 11 and cylinder 9. A distributor block or unit designated by the reference numeral 15 is interposed between the lines 13 and 14.

As shown in details in FIGS. 3, 6, 10 and 11, this distributor block or unit 15 comprises a sliding non-return valve 16 mounted in a bore 17 of block 15 which communicates with the two portions 13 and 13a of the delivery line. This non-return valve is formed with an axial blind hole 18 opening into the bore by means of orifices 19, and normally engages with a shoulder 20 in its closed position a seat 21 formed at one end of the wall constituting this bore (FIG. 3). In this closed position, too, the non-return valve is seated by a spring or like element 22.

The position of this valve in the bore 17 is controlled by a distributor shank 23 pivotally mounted in a bore 24 formed in the block 15 at right angles to the bore 17. This other bore 24 communicates on the one hand with the delivery line 13 and on the other hand with the exhaust line 14a. The distributor shank 23 is formed with a cam-forming bevel portion 25 registering with the non-return valve 16 and controlling (according to its angular position in the bore 24) the position of this valve.

The exhaust line 14, 14a communicates with a third cylindrical bore 26 formed in the block 15 and constituting the chamber of a piston-shaped regulating member 27 slidably mounted in this chamber 26 and controlling, according to its position, the cross-sectional area available between the two sections 14 and 14a of this exhaust line. This piston 27 is hydraulically actuated by means of a branch duct 28 whereby the bore 24 may be connected to chamber 26 in order to supply fluid under pressure under the piston 27.

As illustrated in FIGS. 3, 6, 10 and 11, a lower cylindrical portion 29 of shank 23 constitutes a distributor member adapted to cause the aforesaid branch duct 28 to communicate either with the bore 24 and the delivery line 13 through the medium of an inner duct 30a, or with a return line 32 connected to the tank 10 through the medium of another inner passage 30b. Finally, a third inner duct 30 containing a calibrated spring-loaded ball valve designated by the reference numeral 31 and acting as an overload valve is formed in the shank 23 and communicates at its upper portion with the inner exhaust duct 14a and at its lower portion with the return line 32. In all cases, it permits of reducing the pressure existing in the distributor block to a predetermined value which is a function of the force of the spring acting upon the ball 31.

The chamber 26 of piston 27 is closed at its lower portion by a plug or socket 33 through which extends an axially sliding rod 34 constituting a push-rod mounted under and partly within the piston 27 coaxially with a return spring 35 normally urging this piston toward its closed position.

Figure 9:
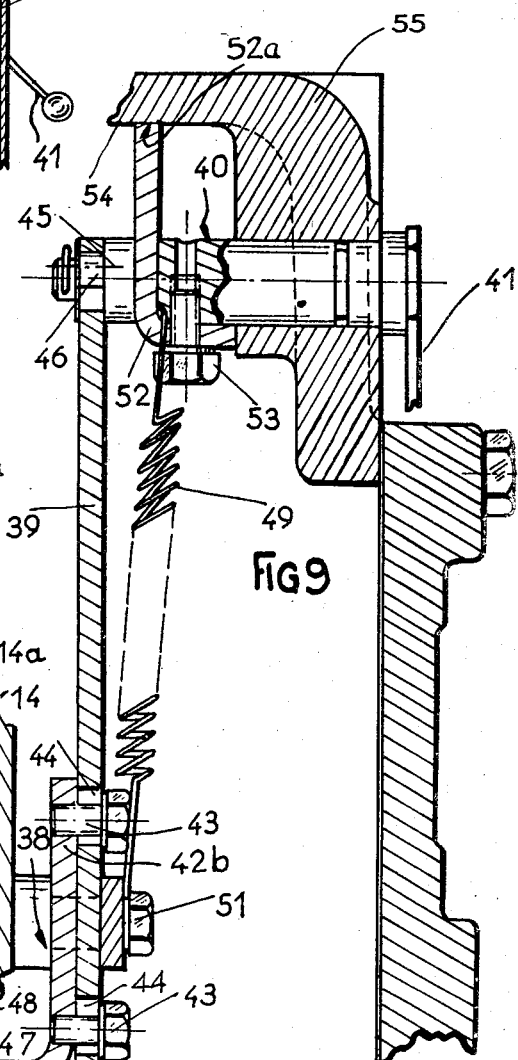
FIGURE 9 is a side view taken in the direction of the arrow F to show the load-transfer control means of FIG. 3.

Under the head 36 of a push-rod 37 projects one arm 42a of a bent control member 38 actuated through the medium of a link 39 and a crank 40 by a load-transfer lever or like member 41 (see FIG. 9).

Preferably, the bent control member 38 is attached by its other arm 42b to the end of the transmission link 39 by means of bolts or like fastening members 43 extending through oblong holes or slots 44 formed in the link 39 to permit the adjustment of the position of the arm 42a of member 38 acting upon the push-rod 34 with respect to a pivot pin 45 of crank 40. The aforesaid link 39 has its other end trunnioned on a cylindrical journal portion 46 formed endwise of the crankshaft 40, this journal being slightly eccentric with respect to the main axis of this member 40, whereby during the rotation of this member it is possible to actuate the push-rod 34 very gradually.

The latter is normally urged toward its lowermost or retracted position by a spring or like elastic means 47 interposed between its head and a projecting collar 48 formed on the cap 33.

The reference numeral 49 designates a return spring interposed for example between a pin 51 bolted on the link 39 and a plate 52 secured on the crankshaft 40 by means of a screw or like fastening member 53, so that the assembly controlling the push-rod 34 will constantly and automatically be returned to its inoperative position as shown in FIG. 3. The aforesaid plate 52 forms with its edge 52a registering with a wall element 54 of a fixed bracket 55 of crankshaft 40 a stop defining the two end positions in which the load-transfer control lever 41 may be set.

The device so far described operates as follows:

In the inoperative condition the distributor shank 23 forming with its lower portion 29 a kind of three-way rotary valve is set as shown in FIG. 3 so that on the one hand the non-return valve 16 will be allowed to be urged against its seat 21 by the relevant spring 22, and on the other hand the communication will be established between the branch duct 28 and tank 10 through the return duct 32. Besides, the load-transfer lever 41 is set in the position shown in FIG. 3 wherein the push-rod 34 is in its lowermost position. The fluid forced by the pump circulates as shown by the arrows in FIG. 3, and when the fluid pressure exerted against the piston 27 attains a sufficient value, this piston is moved from the position shown in dotted lines at 27' to the lower position 27, so that the fluid may escape directly through the return duct 14.

To control the equipment raising movement, the distributor shank 23 is moved to the position shown in FIGURES 10 and 12 so that oil under pressure will be allowed to flow under the piston 27 through the inner duct 30a. The oil pressure plus the action of spring 35 will bring the piston 27 to its closed position. The oil column thus isolated from the tank 10 will lift the non-return valve 16 and is forced into the cylinder 9. The piston 9a in this cylinder will thus raise the plough or other equipment through the medium of the link 8 and coupling bar 4.

To stop this raising movement the distributor shank 23 is returned to the inoperative position shown in FIG. 3. The oil delivered from the pump 11 will then flow back to the tank 10 through the exhaust line 14a—14, and as the pressure within the distributor block is zero, the non-return valve 16 is reseated, thus holding the piston 9a of cylinder 9 against movement and stopping the equipment raising movement.

When it is desired to lower the equipment, the distributor shank 23 is brought to the position shown in FIGURES 11 and 13, thus causing the non-return valve 16 to be unseated, draining the chamber 26 of piston 27 through the branch duct 28, inner duct 30b and return line 32, and finally, draining the cylinder 9 from which the oil is returned along the path shown by the arrows in FIG. 11 so as to push the piston 27 back, before escaping through the line 14.

During all the preceding steps, the push-rod 34 of the load transfer control device remained in its lower position, thus enabling the piston 27 to move freely in the chamber 26.

If, during the operation of the equipment, that is, with the latter lowered to its working position, the tractor wheels tend to slip for lack of grip or ground adhesion, the operator may move the load transfer control lever 41 to the position shown in FIG. 6. As the various component elements of the distributor block are in the "Hold" position shown in FIG. 3, this movement of lever 41 will cause the push-rod 34 to move the piston 27 to the throttling position shown in FIG. 6 so as to reduce the fluid pressure in the feed circuit of cylinder 9. Then, the non-return valve 16 will be slightly opened by the pressure acting thereupon, and the piston 9a of cylinder 9 will be subjected to a reduced pressure. In practice, as this pressure is felt in the cylinder, the control lever 41 should be moved to an extent just sufficient for statically discharging the plough or other equipment of its weight, without altering its working position.

Actually, this gradual control action is permitted by the specific arrangement of the crankshaft 40. Moreover, according to the conditions of operation with which the driver is confronted, he may adjust before the start the degree of load transfer to be obtained, by modifying in the manner previously described the position of the bent control member 38 with respect to the crankshaft pin 45 by means of the pin-and-slot connection 43—44 provided between the control member 38 and the transmission link 39.

Of course, any other adequate manual control member may be provided for controlling the position of push-rod 34 by which the throttling position of piston is adjusted with respect to the exhaust line 14.

Although the present invention has been described in conjunction with preferred embodiments, it is to be understood that modifications and variations may be resorted to without departing from the spirit and scope of the invention, as those skilled in the art will readily understand.

What I claim is:

1. A control device insertable in a hydraulic power circuit system, comprising a casing, an inlet passageway in said casing for a fluid introduced therein under pressure, an outlet conduit in said casing communicating with said inlet passageway, a supply check valve in said casing inserted in said outlet conduit, yieldably urged towards a non-return closed position and adapted to be mechanically opened for allowing back flow of said fluid in said outlet conduit, an exhaust conduit in said casing communicating with said inlet passageway and with said outlet conduit upstream of said check valve, an exhaust valve in said casing inserted in said exhaust conduit and adapted on the one hand to be hydraulically controlled to cut off said exhaust conduit and on the other hand to be mechanically operated to throttle the same to an adjustable extent, a hand-operable distributor means in said casing for mechanically operating said check valve and for hydraulically operating said exhaust valve, and manually actuable control means for mechanically operating said exhaust valve.

2. A control device according to claim 1, wherein said check valve is constituted by a non-return poppet valve having a movable slide portion, being mounted in a bore of said casing forming a portion of said outlet conduit and including an axial blind hole formed in said slide portion and opening into said bore at its upstream end, said bore being formed with a valve seat at its downstream end, the lateral surface of said slide portion having at said downstream end at least one orifice formed therein, and a spring yieldably urging said poppet valve against said seat and toward said closed position.

3. A control device according to claim 1, wherein said casing is formed with a drainway and portions of said casing define a substantially cylindrical chamber closed at one end and opening at the other end in said exhaust conduit, said chamber being operatively connected with said exhaust valve, a piston member slidably mounted in said chamber and adapted for said shut-off and said throttling functions, said piston member having a rear end facing said closed end of the chamber, spring means provided between said closed end and said rear end to yieldably urge said piston member toward an exhaust closing position, a control member forming an adjustable stop for the opening stroke of said piston member and adapted to directly displace the latter toward a preset exhaust throttling position, and a branch duct provided in said casing, opening into said chamber in the space behind said rear end of the piston member and being adapted to be connected through said distributor means on the one hand to said inlet passageway for feeding said space with said fluid so as to cause said piston member to be moved into said closing position, and on the other hand to said drainway to discharge said fluid from said space, and also being adapted to be closed completely at its end remote from said chamber.

4. A control device according to claim 3, wherein said casing is formed with a substantially cylindrical distributing bore provided with a plurality of ports into which open said inlet passageway, said outlet conduit upstream of said check valve, said exhaust conduit upstream of said exhaust valve, said branch duct and said drainway, said distributor means being located in said distributing bore.

5. A control device according to claim 4, wherein said distributor means includes a shank member rotatably mounted in said distributing bore and formed with a substantially cylindrical plug portion forming a three-way distributor adapted to close and to open said drainway, said shank member leaving an annular space between said distributing bore and a portion of said shank member to ensure permanent communication of said fluid between said ports for the inlet passageway, the outlet conduit and the exhaust conduit.

6. A control device according to claim 5, wherein the lateral surface of said plug portion of the shank member is formed with two grooves extending each part of the length of said plug portion and adapted to connect said port for the branch duct to said port for the drainway and to said annular space when said shank member is rotated to bring the respective one of said grooves in register with said branch-duct port.

7. A control device according to claim 6, wherein said check valve is constituted by a non-return poppet valve having a movable slide portion, being mounted in a bore of said casing forming a portion of said outlet conduit and including an axial blind hole formed in said slide portion and opening into said bore at its upstream end, said bore being formed with a valve seat at its downstream end, the lateral surface of said slide portion having at said downstream end at least one orifice formed therein, and a spring yieldably urging said poppet valve against said seat and toward said closed position.

8. A control device according to claim 3, wherein said control means includes a reciprocally movable push-rod adapted to be brought into axial engagement with said rear end of the piston member, resilient means acting upon said push-rod to ensure return motion thereof when said throttling function is to be released, and a linkage to operate said push-rod.

9. A control device according to claim 8, wherein said chamber is closed at said one end by a removable screw cap in abutting engagement with one end of said resilient means and adapted for adjusting the force of the latter, said cap being formed with a central aperture for slidably mounting said push-rod.

10. A control device according to claim 8, wherein said linkage includes slidably mounted bell-crank means acting on said push-rod, a link connected to said bell-crank means, and a manually operable pivoting lever acting on said link.

11. A control device according to claim 10, further comprising an eccentrically located substantially cylindrical gudgeon pin provided on the pivot which mounts said lever, said gudgeon pin being pivotally connected to that end of said link which is opposite said bell-crank means.

12. A control device according to claim 10, further comprising at least one stop for said lever abutting thereagainst in at least one of its operative and inoperative positions, and a return spring to restore said lever to said inoperative position.

13. A control device according to claim 10, further comprising adjusting means interposed between the mounting of said link and said bell-crank means to adjust the position of said push-rod, hence the magnitude of the exhaust throttling required.

14. A control device according to claim 6, further comprising cam-like tappet means provided on said shank member and adapted to cooperate with said check valve for opening same upon rotating said shank member to a determined position, said tappet means and said grooves being disposed in such radial angular relationship on said shank member as to determine a plurality of operating positions thereof with regard to the operative interconnection of said ports.

15. A control device according to claim 6, further comprising a reciprocally movable spring-loaded push-rod adapted on being acted upon to cooperate with said piston member, a slidably mounted bell-crank cooperating with said push-rod, a link connected to said bell-carnk, a hand-operable rocking lever acting on said link, an eccentrically mounted substantially cylindrical gudgeon provided on the pivot mounting said lever and pivotally connected to the end of said link opposite said bell-crank, two stops for said lever abutting thereagainst in its operative and inoperative positions, a return spring to restore said lever to said inoperative position, and adjusting means interposed at the connection of said link and said bell-crank to adjust the operative position of said push-rod.

16. A control device according to claim 6, further comprising a removable cap closing said one end of the chamber in abutting engagement with one end of said spring means, said cap being formed with a central aperture for slidably mounting said push-rod.

17. A control device according to claim 3, wherein said casing is formed with a substantially cylindrical distributing bore provided with a plurality of ports into which open said inlet passageway, said outlet conduit upstream of said check valve, said exhaust conduit upstream of said exhaust valve, said branch duct and said drainway, said distributor means being located in said distributing bore and including a shank member rotatably mounted in said distributing bore and being formed with a substantially cylindrical plug portion and with cam-like tappet means, said plug portion forming a three-way distributor adapted to close and to open said drainway, said shank member leaving an annular space between said distributing bore and a portion of said shank member to ensure permanent communication of said fluid between said ports for the inlet passageway, the outlet conduit and the exhaust conduit, said tappet means being adapted to engage said check valve for opening same when said shank member is rotated to a determined position.

18. A control device according to claim 17, wherein the lateral surface of said plug portion of the shank member is formed with two grooves extending each part of the length of said plug portion and adapted to connect said port for the branch duct to said port for the drainway and to said annular space when said shank member is rotated to bring the respective one of said grooves in register with said branch-duct port, said tappet means and said grooves being disposed in such radial angular relationship on said shank member as to determine four operating positions thereof, that is a neutral hold position wherein said tappet means is out of engagement with said check valve and said branch duct communicates with said drainway, a fluid-feeding position wherein said tappet means is out of engagement with said check valve and said branch duct communicates with said annular space, a fluid-exhaust position wherein said tappet means has opened said check valve and said branch duct communicates with said drainway, and a fluid-bleeding and throttling position wherein said tappet means is out of engagement with said check valve and said branch duct is completely closed.

19. A control device according to claim 3, wherein said casing is formed with a plurality of ports into which open said inlet passageway, said outlet conduit upstream of said check valve, said exhaust conduit upstream of said exhaust valve, said branch duct and said drainway, said distributor means being located in said distributing bore and including a shank member rotatably mounted in said distributing bore and being formed with a substantially cylindrical plug portion forming a three-way distributor adapted to close and to open said drainway, said shank member leaving an annular space between said distributing bore and a portion of said shank member to ensure permanent communication of said fluid between said ports for the inlet passageway, the outlet conduit and the exhaust conduit, said plug portion of the shank member including an axial bore opening at one end in said drainway and at the other end in said annular space, and a relief valve inserted in said bore and biased so as to close same except in case of over-pressure of said fluid from said annular space.

References Cited in the file of this patent

UNITED STATES PATENTS

| | | |
|---|---|---|
| 2,165,001 | Meyer | July 4, 1939 |
| 2,459,613 | Baker | Jan. 18, 1949 |
| 2,679,263 | Kiser et al. | May 25, 1954 |
| 2,847,029 | McRae | Aug. 12, 1958 |
| 2,847,030 | McRae | Aug. 12, 1958 |
| 2,964,908 | Pomper et al. | Dec. 20, 1960 |
| 3,045,697 | Seguenot | July 24, 1962 |

FOREIGN PATENTS

| | | |
|---|---|---|
| 718,980 | Great Britain | Nov. 24, 1954 |